United States Patent
Sheridan

(10) Patent No.: US 10,634,237 B2
(45) Date of Patent: Apr. 28, 2020

(54) LUBRICANT DELIVERY SYSTEM FOR PLANETARY FAN DRIVE GEAR SYSTEM

(71) Applicant: United Technologies Corporation, Farmington, CT (US)

(72) Inventor: William G. Sheridan, Southington, CT (US)

(73) Assignee: United Technologies Corporation, Farmington, CT (US)

(*) Notice: Subject to any disclaimer, the term of this patent is extended or adjusted under 35 U.S.C. 154(b) by 703 days.

(21) Appl. No.: 15/132,602

(22) Filed: Apr. 19, 2016

(65) Prior Publication Data
US 2016/0377165 A1   Dec. 29, 2016

Related U.S. Application Data

(60) Provisional application No. 62/183,812, filed on Jun. 24, 2015.

(51) Int. Cl.
*F16H 57/04* (2010.01)
*F02C 3/107* (2006.01)
(Continued)

(52) U.S. Cl.
CPC ......... *F16H 57/0479* (2013.01); *F01D 25/18* (2013.01); *F02C 3/107* (2013.01);
(Continued)

(58) Field of Classification Search
CPC .. F16H 57/00; F16H 57/0456; F16H 57/0427; F16H 57/0479; F16H 57/0471;
(Continued)

(56) References Cited

U.S. PATENT DOCUMENTS

| | | |
|---|---|---|
| 5,107,676 A | 4/1992 | Hadaway et al. |
| 5,472,383 A | 12/1995 | McKibbin |

(Continued)

FOREIGN PATENT DOCUMENTS

| | | |
|---|---|---|
| EP | 2559914 A1 | 2/2013 |
| WO | 2014/143876 A1 | 9/2014 |

OTHER PUBLICATIONS

European Search Report for EP Application No. 16175865.1 dated Nov. 18, 2016.

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

A gear system for a turbofan engine assembly includes a sun gear rotatable about an engine centerline, a non-rotatable ring gear, a rotating carrier that drives a fan, and a plurality of planet gears intermeshed between the sun gear and the ring gear. Each of the plurality of planet gears supported on rolling element bearings fit into the carrier. Each of the plurality of planet gears includes an inner cavity and a lubricant passage directed at the rolling element bearings. The carrier includes an outer scoop that receives lubricant from an outer fixed lubricant jet and feeds lubricant into the inner cavity and through the lubricant passage to spray lubricant on to the rolling element bearings. A geared turbofan engine assembly is also disclosed.

18 Claims, 3 Drawing Sheets

(51) Int. Cl.
*F02K 3/06* (2006.01)
*F01D 25/18* (2006.01)
*F02K 3/02* (2006.01)
*F16H 57/08* (2006.01)

(52) U.S. Cl.
CPC .................. *F02K 3/02* (2013.01); *F02K 3/06* (2013.01); *F16H 57/0427* (2013.01); *F16H 57/0456* (2013.01); *F16H 57/0471* (2013.01); *F16H 57/0486* (2013.01); *F16H 57/082* (2013.01); *F05D 2260/40311* (2013.01); *F05D 2260/602* (2013.01); *F05D 2260/98* (2013.01); *F16H 2057/085* (2013.01)

(58) Field of Classification Search
CPC ............... F16H 57/0486; F16H 57/082; F16H 2057/085; F01D 25/16; F01D 25/18; F01D 15/12; F02C 3/107; F02C 7/06; F02C 7/36; F02K 3/02; F02K 3/06

USPC ....................................................... 60/226.1
See application file for complete search history.

(56) References Cited

U.S. PATENT DOCUMENTS

| | | | |
|---|---|---|---|
| 8,523,725 B2 | 9/2013 | Torii et al. | |
| 8,640,336 B2 | 2/2014 | Sheridan et al. | |
| 8,678,743 B1* | 3/2014 | Sheridan | F02C 7/36 |
| | | | 415/1 |
| 8,813,469 B2 | 8/2014 | Sheridan | |
| 8,820,478 B2 | 9/2014 | Gauthier et al. | |
| 8,898,900 B2 | 12/2014 | Sheridan et al. | |
| 8,939,864 B2 | 1/2015 | McCune et al. | |
| 2003/0236148 A1* | 12/2003 | Fox | F16C 19/386 |
| | | | 475/348 |
| 2013/0225353 A1* | 8/2013 | Gallet | F16H 57/0423 |
| | | | 475/159 |

* cited by examiner

LUBRICANT DELIVERY SYSTEM FOR PLANETARY FAN DRIVE GEAR SYSTEM

CROSS REFERENCE TO RELATED APPLICATION

This application claims priority to United States Provisional Application No. 62/183,812 filed on Jun. 24, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

One example of an epicyclical gear assembly includes a sun gear that drives planet gears supported in a rotating carrier within a fixed ring gear. Accordingly, the planet gears rotate both about an individual gear axis, but also about the carrier rotational axis. Lubrication is required on all gear mesh interfaces and bearing surfaces.

SUMMARY

In a featured embodiment, a gear system for a turbofan engine assembly includes a sun gear rotatable about an engine centerline, a non-rotatable ring gear, a rotating carrier that drives a fan, and a plurality of planet gears intermeshed between the sun gear and the ring gear. Each of the plurality of planet gears supported on rolling element bearings fit into the carrier. Each of the plurality of planet gears includes an inner cavity and a lubricant passage directed at the rolling element bearings. The carrier includes an outer scoop that receives lubricant from an outer fixed lubricant jet and feeds lubricant into the inner cavity and through the lubricant passage to spray lubricant on to the rolling element bearings.

In another embodiment according to the previous embodiment, the carrier includes an inner lubricant scoop that receives lubricant from an inner fixed lubricant jet and directs lubricant through a carrier lubricant passage to at least one spray bar supported by the carrier for directing lubricant into a gear interface between one of the plurality of planet gears and one of the sun gear and the ring gear.

In another embodiment according to any of the previous embodiments, the outer scoop includes an accumulator portion for holding a quantity of lubricant before entering the inner cavity.

In another embodiment according to any of the previous embodiments, the inner scoop includes an accumulator portion for holding a quantity of lubricant prior to entering the lubricant passage. The accumulator portion accumulates lubricant for generating a pressure utilized to expel lubricant under pressure into the gear interface.

In another embodiment according to any of the previous embodiments, the carrier includes a forward plate attached to an aft plate with a fastener and the plurality of planet gears are supported by the carrier between the forward plate and the aft plate.

In another embodiment according to any of the previous embodiments, the carrier has a larger outer diameter than a pitch diameter of the ring gear.

In another embodiment according to any of the previous embodiments, the reduction ratio of the gear system is between 3:1 and 5:1 and the number of planets is at least 3.

In another embodiment according to any of the previous embodiments, the carrier includes an opening with an inner diameter to accommodate an input shaft driving the sun gear.

In another embodiment according to any of the previous embodiments, the rolling element bearings include one of a roller bearing, ball bearing, tapered roller bearing, and spherical bearing.

In another embodiment according to any of the previous embodiments, the rolling element bearings include multiple rows of rolling element bearings.

In another embodiment according to any of the previous embodiments, at least one of the ring gear and sun gear is flexibly mounted.

In another featured embodiment, a geared turbofan engine assembly includes a fan configured to drive air along a bypass flow path. A compressor section is configured to communicate compressed air to a combustor section for generating a high energy gas flow for driving a turbine section where energy is extracted and utilized to drive the compressor section and the fan. A gear system is driven by the turbine section for driving the fan. The gear system includes a sun gear rotatable about an engine centerline, a non-rotatable ring gear, a rotating carrier that drives the fan, and a plurality of planet gears intermeshed between the sun gear and a fixed ring gear. The plurality of planet gears is supported on rolling element bearings fit into the carrier. Each of the plurality of planet gears includes an inner cavity and a lubricant passage directed at the rolling element bearings. The carrier includes an outer scoop that receives lubricant from an outer fixed lubricant jet and feeds lubricant into the inner cavity and through the lubricant passage to spray lubricant on to the rolling element bearings.

In another embodiment according to the previous embodiment, the carrier includes an inner lubricant scoop that receives lubricant from an inner fixed lubricant jet and directs lubricant through a carrier lubricant passage to at least one spray bar supported by the carrier for directing lubricant into a gear interface between one of the plurality of planet gears and one of the sun gear and the ring gear.

In another embodiment according to any of the previous embodiments, the outer scoop includes an outer accumulator portion for holding a quantity of lubricant before entering the inner cavity and the inner scoop includes an inner accumulator portion for holding a quantity of lubricant prior to entering the lubricant passage. The inner accumulator portion accumulates lubricant for generating a pressure utilized to expel lubricant under pressure into the gear interface.

In another embodiment according to any of the previous embodiments, the carrier includes a forward plate attached to an aft plate with a fastener and the plurality of planet gears are supported by the carrier between the forward plate and the aft plate.

In another embodiment according to any of the previous embodiments, the carrier has a larger outer diameter than a pitch diameter of the ring gear.

In another embodiment according to any of the previous embodiments, the reduction ratio of the gear system is between 3:1 and 5:1 and the number of planets is at least 3.

In another embodiment according to any of the previous embodiments, the rolling element bearings include one of a roller bearing, ball bearing, tapered roller bearing, and spherical bearing.

In another embodiment according to any of the previous embodiments, the rolling element bearings include multiple rows of rolling element bearings.

In another embodiment according to any of the previous embodiments, at least one of the ring gear and sun gear is flexibly mounted.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
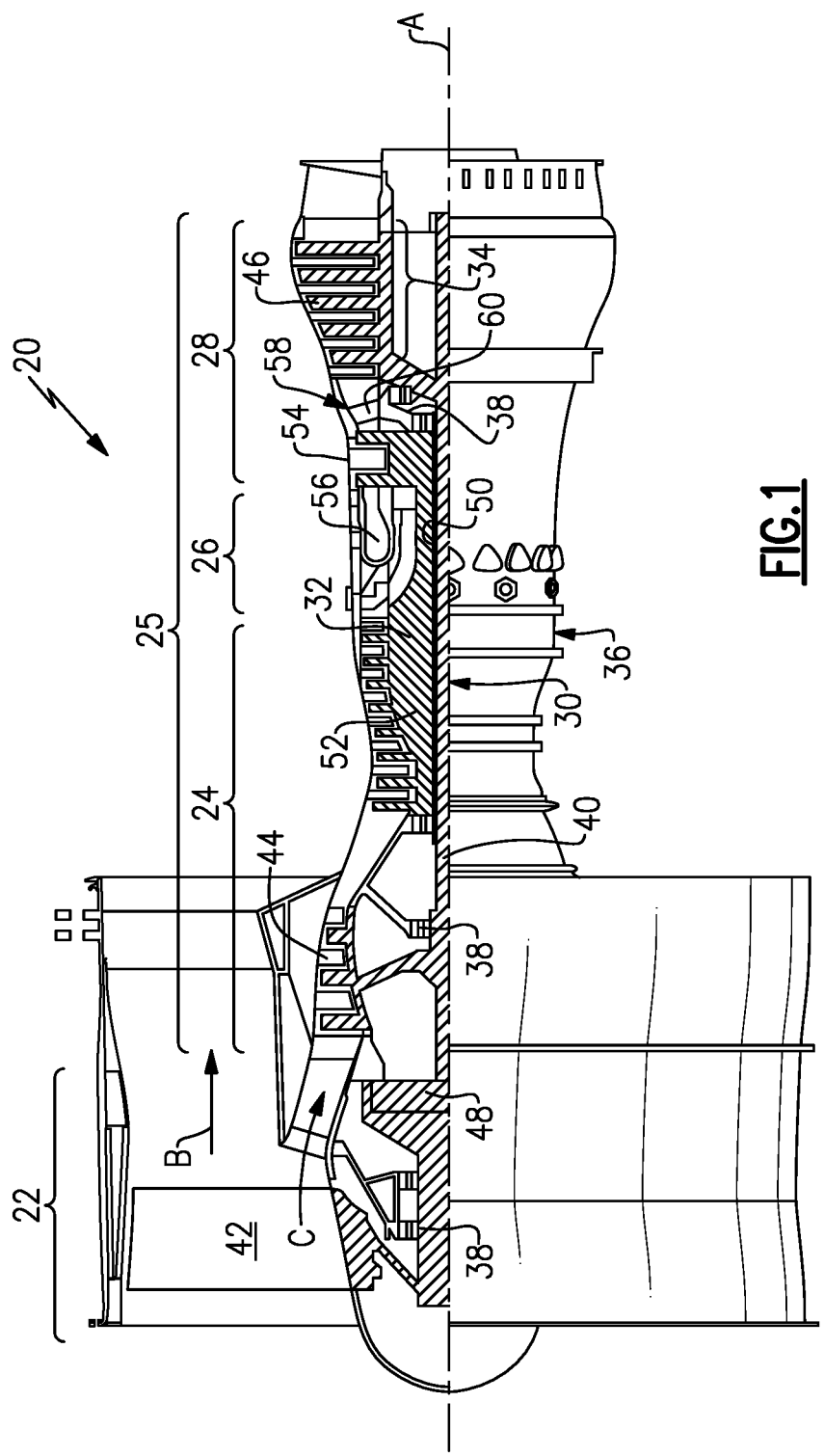
FIG. 1 schematically shows an example embodiment of a geared turbofan engine.

FIG. 1 schematically illustrates an example gas turbine engine 20 that includes a fan section 22 and a core engine section 25. The core engine section 25 includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 3:1.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

Fan pressure ratio is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

Corrected fan tip speed is the actual fan tip speed in ft/sec divided by an industry standard temperature correction of $[(Tram\ °R)/(518.7°\ R)]^{0.5}$. The corrected fan tip speed, as disclosed herein according to one non-limiting embodiment, is less than about 1150 ft/second. The low fan pressure ratio and fan tip speed are applicable throughout all operational phases of the gas turbine engine and at least at the bucket cruise thrust specific fuel consumption operating conditions.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
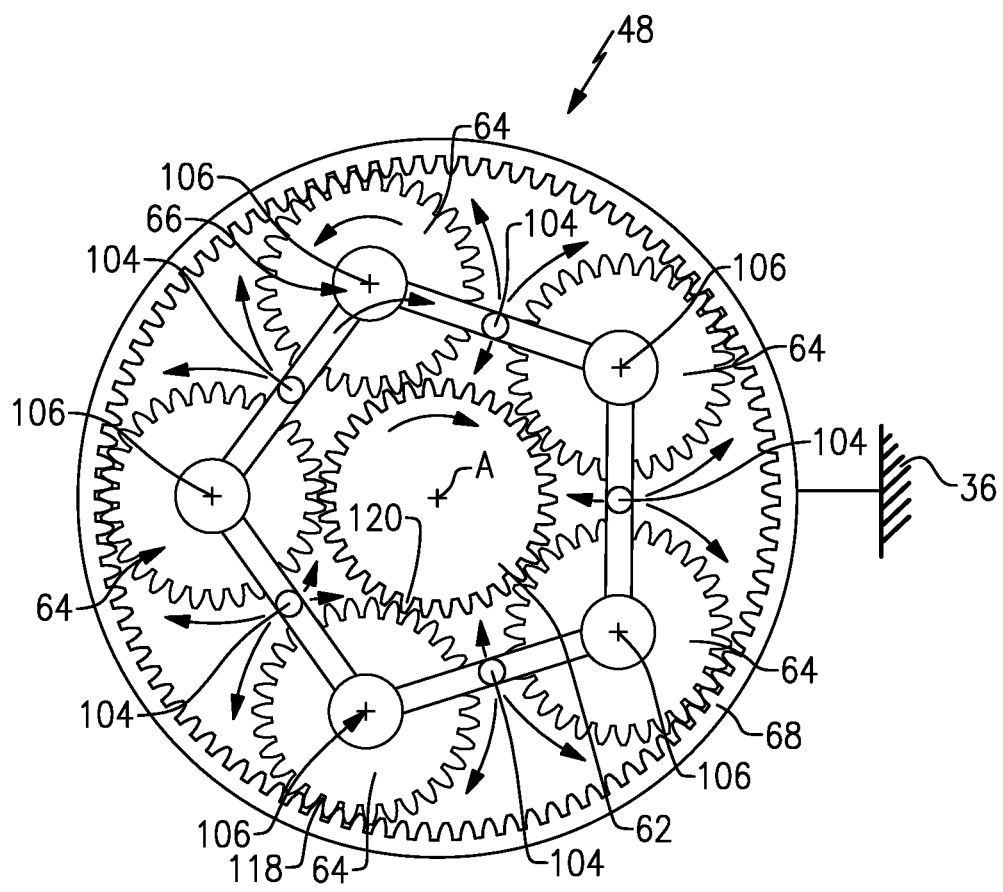
FIG. 2 schematically shows an example embodiment of a gear system.

Referring to FIG. 2 with continued reference to FIG. 1, an example disclosed geared architecture includes a sun gear 62 driven by the low pressure turbine 46 through the shaft 40. A plurality of planet gears 64 are supported within a carrier 66 and are intermeshed with the sun gear 62. The planet gears 64 each rotate about individual rotational axes 106 that are parallel to the engine axis A. The planet gears 64 also mesh with ring gear 68. The ring gear 68 is fixed to a static structure 36 of the engine 20. The carrier 66 rotates about the axis A to drive the fan section 22. Because the carrier 66 rotates, roller element bearings 78 (FIG. 3) supporting rotation of the planet gears 64 experience increased loading and therefore an increased demand for lubrication.

Figure 3:
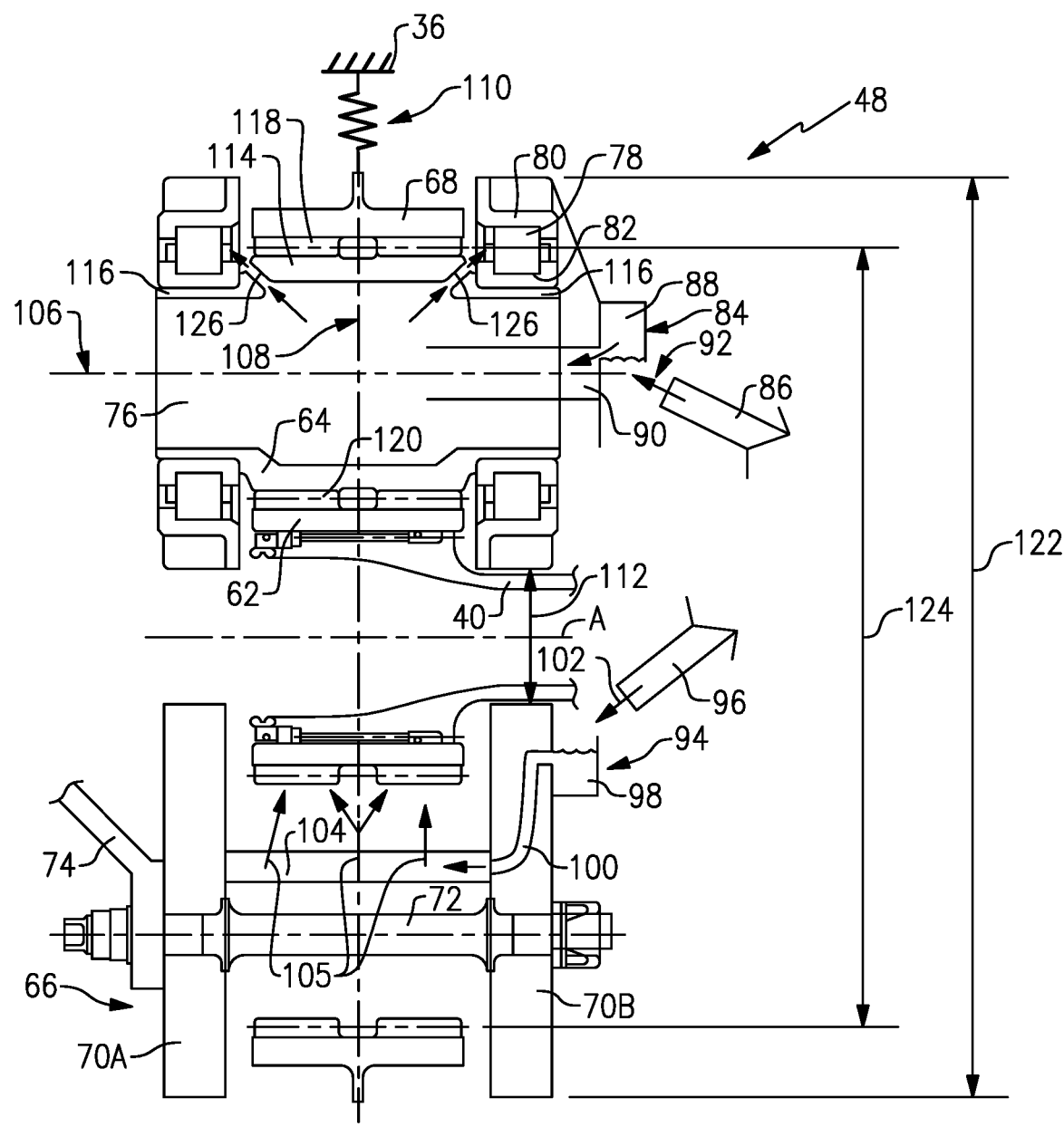
FIG. 3 is a schematic cross-section of the example gear system.

Referring to FIG. 3 with continued reference to FIGS. 1 and 2, the sun gear 62 is driven by the inner shaft 40 driven by the low pressure turbine 46. The ring gear 68 is fixed to the static structure 36. In this example, a flexible mount 110 supports the ring gear 68 to the static engine structure 36. The flexible mount 110 accommodates misalignment and relative movement during operation. The sun gear 62 may also be flexibly mounted to the inner shaft 40 to provide an accommodation for misalignment with the planet gears 64.

The example geared architecture 48 is a single stage epicyclic gear system arranged such that each of the sun gear 62, planet gears 64 and ring gear 68 are centered along a gear centerline 108 normal to the engine axis A. The single stage gear system provides a single output to the fan shaft 74 from a single input from the inner shaft 40. Between three (3) and five (5) planet gears 64 may be supported within the carrier 66 and meshed between the sun gear 62 and the ring gear 68. The example geared architecture provides a speed reduction from the input provided by the inner shaft 40 to the output to the fan shaft 74 of between about 3:1 and about 5:1.

The example planet gears 64 include gear teeth 114 disposed between ends 116. The example planet gears 64 are supported on each of end 116 by large load capacity rolling element bearings 78 installed in the carrier 66. The rolling element bearings 78 are supported between an inner race 82 and an outer race 80. The rolling element bearings 78 may be any of a roller bearing, ball bearing, tapered roller bearing, and spherical bearing. Moreover, although a single row of rolling element bearings 78 are shown supporting each end of the planet gears 64, multiple rows of rolling bearings are also within the contemplation of this disclosure.

The example carrier 66 includes a forward plate 70A attached to an aft plate 70B by at least one fastener 72. The forward plate 70A is forward of the gear centerline 108 toward the fan section 22 and the aft plate 70B is aft of the gear centerline 108. The carrier 66 includes an outer diameter 122 that is larger than a pitch diameter 124 of the ring gear 68. Accordingly, the forward plate 70A and aft plate 70B structure enable separation of the carrier 66 for installation of the ring gear 68. At least some of the example fasteners 72 may be utilized to attach the carrier 66 to the fan shaft 74. The carrier 66 further includes an opening 112 with an inner diameter that accommodates the inner shaft 40.

Rotation of the planet gears 64 about each individual rotational axis 106 along with rotation about the engine axis A imparts loads on the rolling element bearings 78 greater than loads encountered for fixed carrier geared architectures. Moreover, rotation of the carrier 66 requires lubricant communication between a fixed engine structure and the rotating carrier 66.

The example carrier 66 includes an outer scoop 84 that receives lubricant such as oil from a fixed outer jet 86. The outer scoop 84 includes an outer accumulator portion 88 and a tube portion 90. The outer jet 86 propels lubricant 92 into the outer accumulator portion 88 of the outer scoop 84. In the outer accumulator portion 88, oil builds until achieving a level that communicates with the tube portion 90 to an internal cavity 76 of each planet gear 64. Oil in the inner cavity 76 further builds in pressure due to circumferential forces driving oil outward toward lubricant passages 126 that expel oil directly onto the roller bearing 78. Oil is therefore communicated from the static outer jet 86 into the bearing 78 through the inner cavity 76 of each of the plurality of planet gears 64 and through lubricant passages 126 to the roller bearing 78.

Gear teeth 114 of each planet gear 64 mesh with the sun gear 62 at a gear interface 120 and the ring gear 68 at gear interface 118. Each gear interface 118,120 is lubricated with lubricant supplied by one of a plurality of spray bars 104. Each of the plurality of spray bars 104 is in communication with passages 100 through the carrier 66. The passages 100 receive lubricant 102 from a fixed inner lubricant jet 96 via an inner scoop 94. The inner scoop 94 includes an inner accumulator portion 98 that receives oil expelled from the inner lubricant jet 96. A quantity of oil accumulates in the inner accumulator portion 98 until the level of oil is in communication with the passage 100. The accumulated quantity of oil generates a pressure utilized to drive lubricant through the passages 100 and out the spray bar 104 into the gear interfaces 118,120. The example spray bar 104 is schematically shown and may be of any shape or configuration that enables jetting of lubricant via radial passages 105 into the gear interfaces 118, 120.

The inner scoop 94 and the outer scoop 84 are illustrated as structures attached to the aft plate 70B of the carrier 66. The inner scoop 94 and outer scoop 84 may also be integral structures defined within the aft plate 70B of the carrier 66. Moreover, it is within the contemplation of this disclosure that the inner and outer scoops 84, 94 may be defined, or mounted to the either the forward plate 70A or the aft plate 70B of the carrier 66 to accommodate different engine configurations.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear system for a turbofan engine assembly comprising:
   a sun gear rotatable about an engine centerline;
   a non-rotatable ring gear;
   a rotating carrier that drives a fan; and
   a plurality of planet gears intermeshed between the sun gear and the ring gear, each of the plurality of planet gears supported on rolling element bearings disposed between a radially outer surface at each end of each of the plurality of planet gears and the carrier, wherein each of the plurality of planet gears includes an inner cavity and a lubricant passage directed at the rolling element bearings disposed within the carrier, the carrier including an outer scoop that receives lubricant from an outer fixed lubricant jet and feeds lubricant into the inner cavity and through the lubricant passage to spray lubricant on to the rolling element bearings and the carrier has a larger outer diameter than a pitch diameter of the ring gear.

2. The gear system as recited in claim 1, wherein the carrier includes an inner lubricant scoop that receives lubricant from an inner fixed lubricant jet and directs lubricant through a carrier lubricant passage to at least one spray bar supported by the carrier for directing lubricant into a gear interface between one of the plurality of planet gears and one of the sun gear and the ring gear.

3. The gear system as recited in claim 2, wherein the outer scoop includes an outer accumulator portion for holding a quantity of lubricant before entering the inner cavity.

4. The gear system as recited in claim 3, wherein the inner scoop includes an inner accumulator portion for holding quantity of lubricant prior to entering the lubricant passage, wherein the inner accumulator portion accumulates lubricant for generating a pressure utilized to expel lubricant under pressure into the gear interface.

5. The gear system as recited in claim 4, wherein the carrier comprises a forward plate attached to an aft plate with a fastener and the rolling element bearings are supported within an inner race and an outer race supported in each of the forward plate and the aft plate to support each of the ends of the plurality of planet gears supported by the carrier between the forward plate and the aft plate.

6. The gear system as recited in claim 5, wherein the reduction ratio of the gear system is between 3:1 and 5:1 and the number of planet gears is at least 3.

7. The gear system as recited in claim 6, wherein the carrier includes an opening with an inner diameter to accommodate an input shaft driving the sun gear.

8. The gear system as recited in claim 1, wherein the rolling element bearings comprise one of a roller bearing, ball bearing, tapered roller bearing, and spherical bearing.

9. The gear system as recited in claim 1, wherein the rolling element bearings comprise multiple rows of rolling element bearings.

10. The gear system as recited in claim 1, wherein at least one of the ring gear and sun gear is flexibly mounted.

11. A geared turbofan engine assembly comprising:
    a fan configured to drive air along a bypass flow path;
    a compressor section configured to communicate compressed air to a combustor section for generating a high energy gas flow for driving a turbine section where energy is extracted and utilized to drive the compressor section and the fan; and
    a gear system driven by the turbine section for driving the fan, the gear system including a sun gear rotatable about an engine centerline, a non-rotatable ring gear, a rotating carrier that drives the fan, and a plurality of planet gears intermeshed between the sun gear and the non-rotatable ring gear, the plurality of planet gears supported on rolling element bearings mounted between an outer radial surface of each of the plurality of planet gears and the carrier, each of the rolling element bearings spaced apart from an axis of rotation of a corresponding one of the plurality of planet gears, wherein each of the plurality of planet gears includes an inner cavity and a lubricant passage directed at the rolling element bearings mounted within the carrier, the carrier including an outer scoop that receives lubricant from an outer fixed lubricant jet and feeds lubricant into the inner cavity and through the lubricant passage to spray lubricant on to the rolling element bearings and the carrier has a larger outer diameter than a pitch diameter of the ring gear.

12. The geared turbofan engine assembly as recited in claim 11, wherein the carrier includes an inner lubricant scoop that receives lubricant from an inner fixed lubricant jet and directs lubricant through a carrier lubricant passage to at least one spray bar supported by the carrier for directing lubricant into a gear interface between one of the plurality of planet gears and one of the sun gear and the ring gear.

13. The geared turbofan engine assembly as recited in claim 12, wherein the outer scoop includes an outer accumulator portion for holding a quantity of lubricant before entering the inner cavity and the inner scoop includes an inner accumulator portion for holding a quantity of lubricant prior to entering the lubricant passage, wherein the inner accumulator portion accumulates lubricant for generating a pressure utilized to expel lubricant under pressure into the gear interface.

14. The geared turbofan engine assembly as recited in claim 13, wherein the carrier comprises a forward plate attached to an aft plate with a fastener and the rolling element bearings are mounted within an inner race and an outer race supported in each of the forward plate and the aft plate to support each of the ends of and the plurality of planet gears supported by the carrier between the forward plate and the aft plate.

15. The geared turbofan engine assembly as recited in claim 11, wherein the reduction ratio of the gear system is between 3:1 and 5:1 and the number of planet gears is at least 3.

16. The geared turbofan engine assembly as recited in claim 11, wherein the rolling element bearings comprise one of a roller bearing, ball bearing, tapered roller bearing, and spherical bearing.

17. The geared turbofan engine assembly as recited in claim 11, wherein the rolling element bearings comprise multiple rows of rolling element bearings.

18. The geared turbofan engine assembly as recited in claim 11, wherein at least one of the ring gear and sun gear is flexibly mounted.

* * * * *